United States Patent

Rapp et al.

[11] Patent Number: 5,576,252
[45] Date of Patent: Nov. 19, 1996

[54] IRREGULARLY-SHAPED GLASS FIBERS AND INSULATION THEREFROM

[75] Inventors: Charles F. Rapp, Newark; Neil M. Cameron, Granville; Ron W. Mayhew, Newark, all of Ohio

[73] Assignee: Owens-Corning Fiberglas Technology, Inc., Summit, Ill.

[21] Appl. No.: 434,620

[22] Filed: May 4, 1995

[51] Int. Cl.⁶ .......................... C03C 13/00; C03C 13/06
[52] U.S. Cl. .................. 501/35; 501/36; 501/16; 501/17
[58] Field of Search .......................... 501/35, 16, 17, 501/36

[56] References Cited

U.S. PATENT DOCUMENTS

| | | | |
|---|---|---|---|
| 1,828,217 | 10/1931 | Barker, Jr. | 65/121 |
| 2,313,296 | 3/1943 | Lamesch | 49/92 |
| 2,331,945 | 10/1943 | Von Pazsiczky | 49/1 |
| 2,693,668 | 11/1954 | Slayter | 501/35 |
| 2,927,621 | 3/1960 | Slayter et al. | 65/504 |
| 2,998,620 | 9/1961 | Stalego | 501/35 |
| 3,073,005 | 1/1963 | Tiede | 428/370 |
| 3,653,861 | 4/1972 | Stalego et al. | 65/526 |
| 3,791,806 | 2/1974 | Koizumi et al. | 65/405 |
| 3,847,626 | 11/1974 | Erickson et al. | 501/38 |
| 3,847,627 | 11/1974 | Erickson et al. | 501/38 |
| 3,876,481 | 4/1975 | Erickson et al. | 501/38 |
| 3,881,903 | 5/1975 | Stalego | 65/526 |
| 4,145,199 | 3/1979 | Russell | 65/438 |
| 4,177,077 | 12/1979 | Gagin | 501/35 |
| 4,387,180 | 6/1983 | Jen et al. | 501/31 |
| 4,707,399 | 11/1987 | Rambosek | 428/225 |
| 5,055,428 | 10/1991 | Potter | 501/35 |
| 5,108,957 | 4/1992 | Cohen et al. | 501/35 |
| 5,250,488 | 10/1993 | Thelohan et al. | 501/38 |
| 5,332,698 | 7/1994 | Nyssen | 501/35 |
| 5,401,693 | 3/1995 | Bauer et al. | 501/38 |

FOREIGN PATENT DOCUMENTS

| | | |
|---|---|---|
| 0412878 | 1/1990 | European Pat. Off. . |
| 399320 | 11/1990 | European Pat. Off. . |
| 0588251 | 3/1994 | European Pat. Off. . |
| 8912032 | 12/1989 | WIPO . |

*Primary Examiner*—Mark L. Bell
*Assistant Examiner*—Louis M. Troilo
*Attorney, Agent, or Firm*—C. Michael Gegenheimer; Curtis B. Brueske

[57] ABSTRACT

Irregularly-shaped glass fibers and insulation therefrom comprising two different glasses having differing coefficients of thermal expansion. The irregularly-shaped dual-glass fibers exhibit a substantially uniform volume filling nature, and provide improved recovery and thermal conductivity abilities even in the absence of a binder material.

10 Claims, 4 Drawing Sheets

IRREGULARLY-SHAPED GLASS FIBERS AND INSULATION THEREFROM

TECHNICAL FIELD

This invention relates to irregularly-shaped glass fibers suitable for insulation. Each glass fiber comprises two distinct glasses.

BACKGROUND OF THE INVENTION

Glass fibers, mineral fibers and other wool materials have been insulating buildings for some time. Insulation easily fits into the spaces in attics, ceilings, walls, floors and the like.

The common prior art methods for producing glass fiber insulation products involve producing glass fibers from a rotary process. A single molten glass composition is forced through the orifices in the outer wall of a centrifuge or spinner, producing primarily straight glass fibers. The fibers are drawn downward by a blower. The binder required to bond the fibers into a wool product is sprayed onto the fibers as they are drawn downward. The fibers are then collected and formed into a wool pack.

Recent developments include insulation which installs rapidly and effectively between the studs of a building. An exterior layer covers the fibrous batt. Preferably, the exterior layer covering comprises a polyethylene package which receives the fibrous batt. Another focal point of recent developments in insulation is one in which all the binder or essentially all the binder is no longer present in the fibrous batt. Evolution of processes for producing low density insulation provide satisfactory resiliency without a binder in the batt.

Still other developments are insulations of mineral fibers which are irregular in shape. Fibers that are irregular, rather than straight, kinked or even curly, provide a more uniform lattice structure. This uniform volume filling allows for higher recovery ratios. More importantly, uniform volume filling also results in significantly lower thermal conductivity. Also, the greater entanglement of irregularly-shaped fibers provides better wool pack integrity. By sufficient integrity, it is meant that the fibers of the wool batt will remain entangled and not separate.

DISCLOSURE OF THE INVENTION

The present invention provides irregularly-shaped glass fibers suitable for insulation. Each glass fiber comprises two distinct glasses. Each glass has a different coefficient of thermal expansion (CTE). Each glass has a different glass composition and is boron-free. The first boron-free glass composition by weight percent consists essentially of:

| Ingredients | Broad | Preferred | Most Preferred | Higher Dissolution Rate Glasses |
| --- | --- | --- | --- | --- |
| $SiO_2$ | 35–65 | 40–64 | 45–63 | 40–64 |
| $Al_2O_3$ | 0–17 | 0–16 | 0–15 | 0–5 |
| MgO | 0–30 | 1–27 | 2–25 | 0–30 |
| CaO | 5–40 | 10–37 | 15–35 | 5–40 |
| FeO | 0–17 | 0–16 | 0–15 | 0–17 |
| $Na_2O + K_2O$ | 0–10 | 0–5 | 0–2.5 | 0–10 |
| $SiO_2 + Al_2O_3$ | ≧45 ≦70 | ≧47 ≦67 | ≧50 ≦65 | ≧45 ≦69 |
| Temperature for a Viscosity of 10 Poise; °F. | >2350 <3400 | >2400 <3200 | >2450 <3000 | >2350 <3400 |

$FeO+Fe_2O_3$ is expressed as FeO.

Generally, $TiO_2$, MnO, and other impurities can be present in amounts up to several percent. It is generally desirable that the $Na_2O+K_2O$ be less than several percent to keep the CTE low.

The second boron-free glass composition consists by weight percent essentially of:

| Ingredients | Broad | Preferred | Most Preferred | Higher Dissolution Rate Glasses |
| --- | --- | --- | --- | --- |
| $SiO_2$ | 35–65 | 40–64 | 45–63 | 40–64 |
| $Al_2O_3$ | 0–17 | 0–16 | 0–15 | 0–5 |
| MgO | 0–30 | 1–27 | 2–25 | 0–30 |
| CaO | 5–40 | 10–37 | 15–35 | 5–40 |
| FeO | 0–17 | 0–16 | 0–15 | 0–17 |
| $Na_2O + K_2O$ | 0–25 | 7–22 | 10–20 | 0–25 |
| $SiO_2 + Al_2O_3$ | ≧45 ≦70 | ≧47 ≦67 | ≧50 ≦65 | ≧45 ≦69 |
| Temperature for a Viscosity of 10 Poise; °F. | >2350 <3400 | >2400 <3200 | >2450 <3000 | >2350 <3400 |

$FeO+Fe_2O_3$ is expressed as FeO.

Generally, $TiO_2$, MnO, and other impurities can be present in amounts up to several percent. It is generally desirable that the $Na_2O+K_2O$ be greater than several percent to increase the CTE.

Relatively high amounts of FeO (greater then about 5%) is desirable in applications where a high fire resistance or high temperature performance is needed.

The glasses have a viscosity of 10 poise at a temperature ranging from 2350° to 3400° F. and have a liquidus at least 50° F. below the 10 poise viscosity temperature.

This invention produces two component glass fibers from CaO—MgO—$Al_2O_3$—FeO—$SiO_2$ and/or $Na_2O$—CaO—MgO—$Al_2O_3$—FeO—$SiO_2$ type glasses by a "mineral wool" process. The two components have different thermal contractions so that the fiber curls on cooling. Glasses used previously to produce two component fibers by the rotary process were based on the $Na_2O$—$B_2O_3$—$Al_2O_3$—MgO—CaO—$SiO_2$ system. "Mineral wool" type glasses are generally lower cost. However, they are more difficult to form into fiber because of their low viscosity at their liquidus temperature. In this invention, we discovered that two component glass fibers could be formed from "mineral wool" type glasses by feeding the glasses through a single hole and blowing them with a gas jet.

BEST MODE OF CARRYING OUT INVENTION

Figure 1:
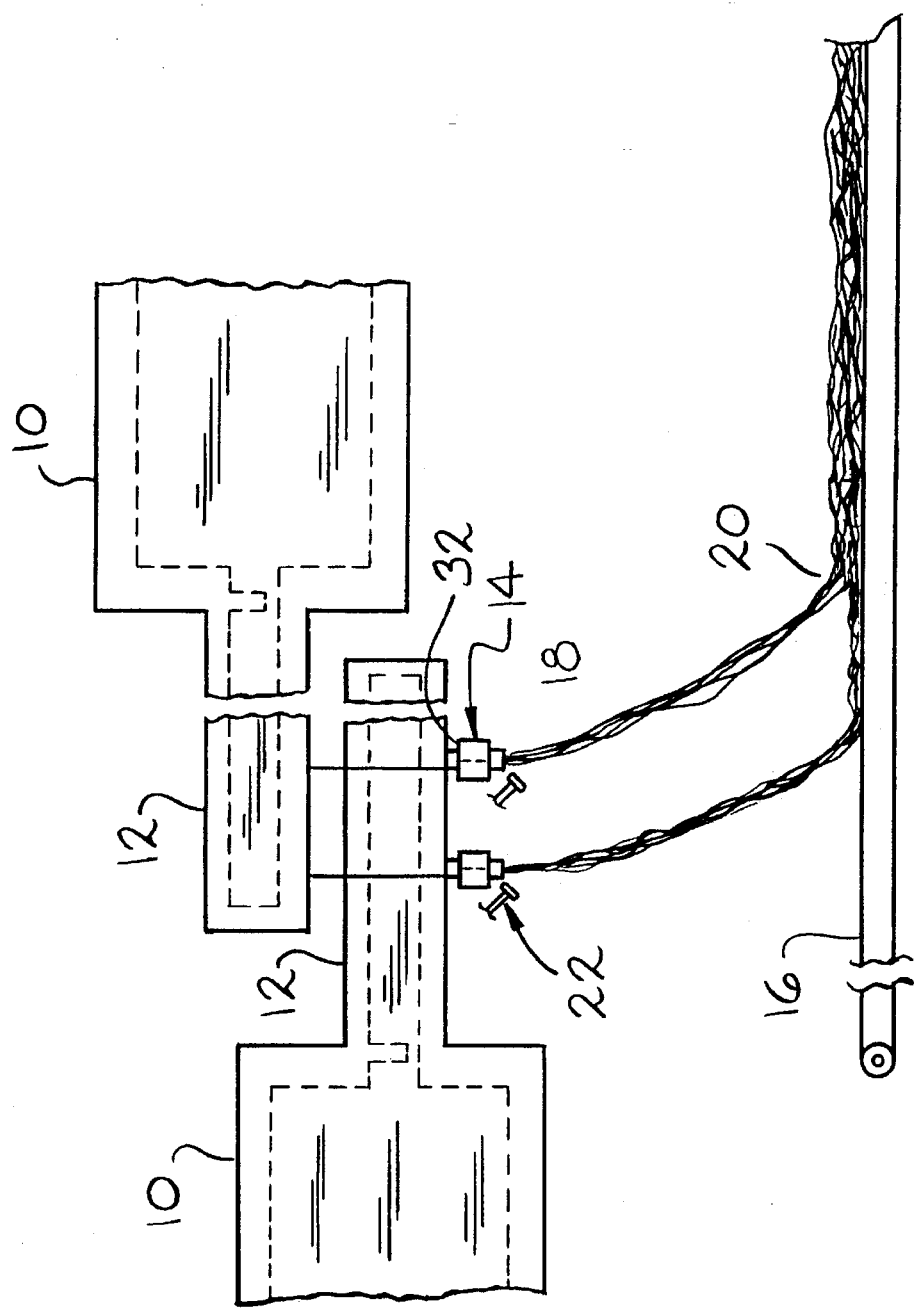
FIG. 1 is a view of a process by which the insulation of the present invention may be produced.

FIG. 1 shows two distinct molten glass compositions supplied from furnaces 10 via forehearths 12 to fiberizers 14. Preferably, the glasses have coefficients of thermal expansion differing by at least 2.0 ppm/°C. Veils of irregularly-shaped glass fibers 18 produced by the fiberizers are collected on conveyor 16 as wool pack 20 by means of a vacuum positioned beneath the conveyor. As the fibers are blown downward by air or gases to the conveyor by means of blowers 22 in the fiberizers, they are attenuated and assume their irregular shape. The wool can be used as collected as insulation for buildings and other purposes. Alternatively, the wool can be wrapped in plastic film and used as insulation.

Figure 2:
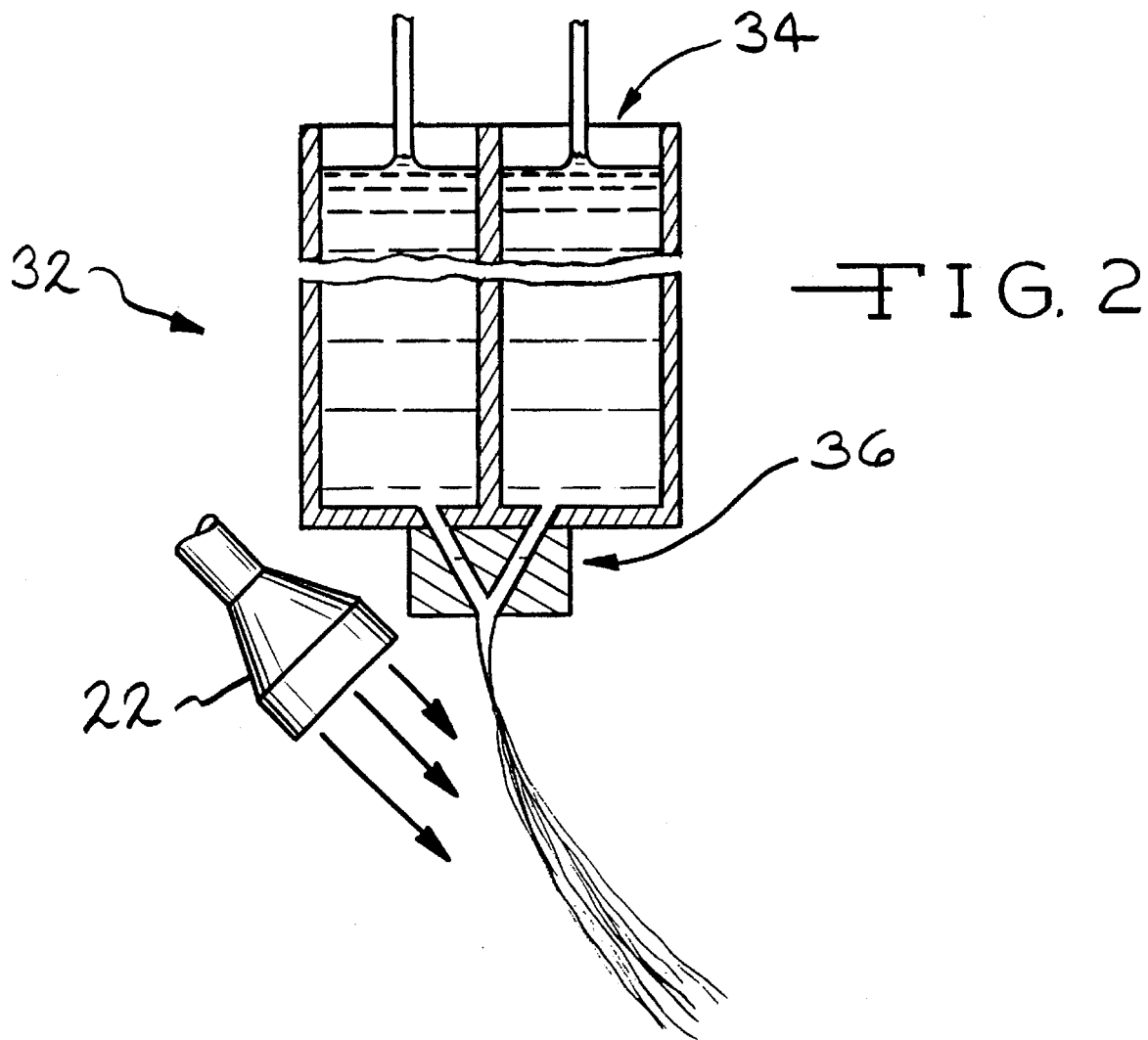
FIG. 2 is a view of a fiberizer by which the fibers of the present invention may be produced.

FIG. 2 shows fiberizer 32 which is a platinum crucible. Fiberizer 32 has a platinum divider 34 which keeps the molten glasses separate. The lower portion of fiberizer 32 is Pt tip 36 to which divider 34 extends. Blower 22 is a "V" nozzle with air at 90 psi. The molten glasses flow out of tip 36 and are fiberized with air from blower 22.

Figure 3:
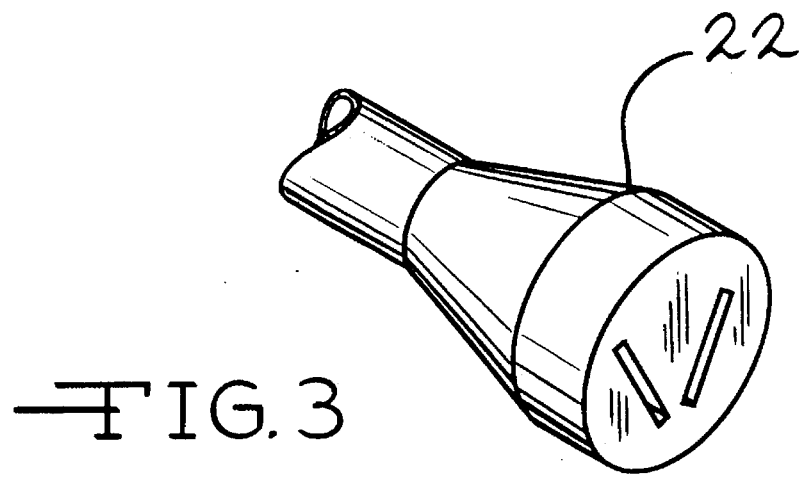
FIG. 3 is a view of a V-shaped blower used to blow fibers of the present invention.

FIG. 3 is a view of the V-nozzle in blower 22.

Figure 4:
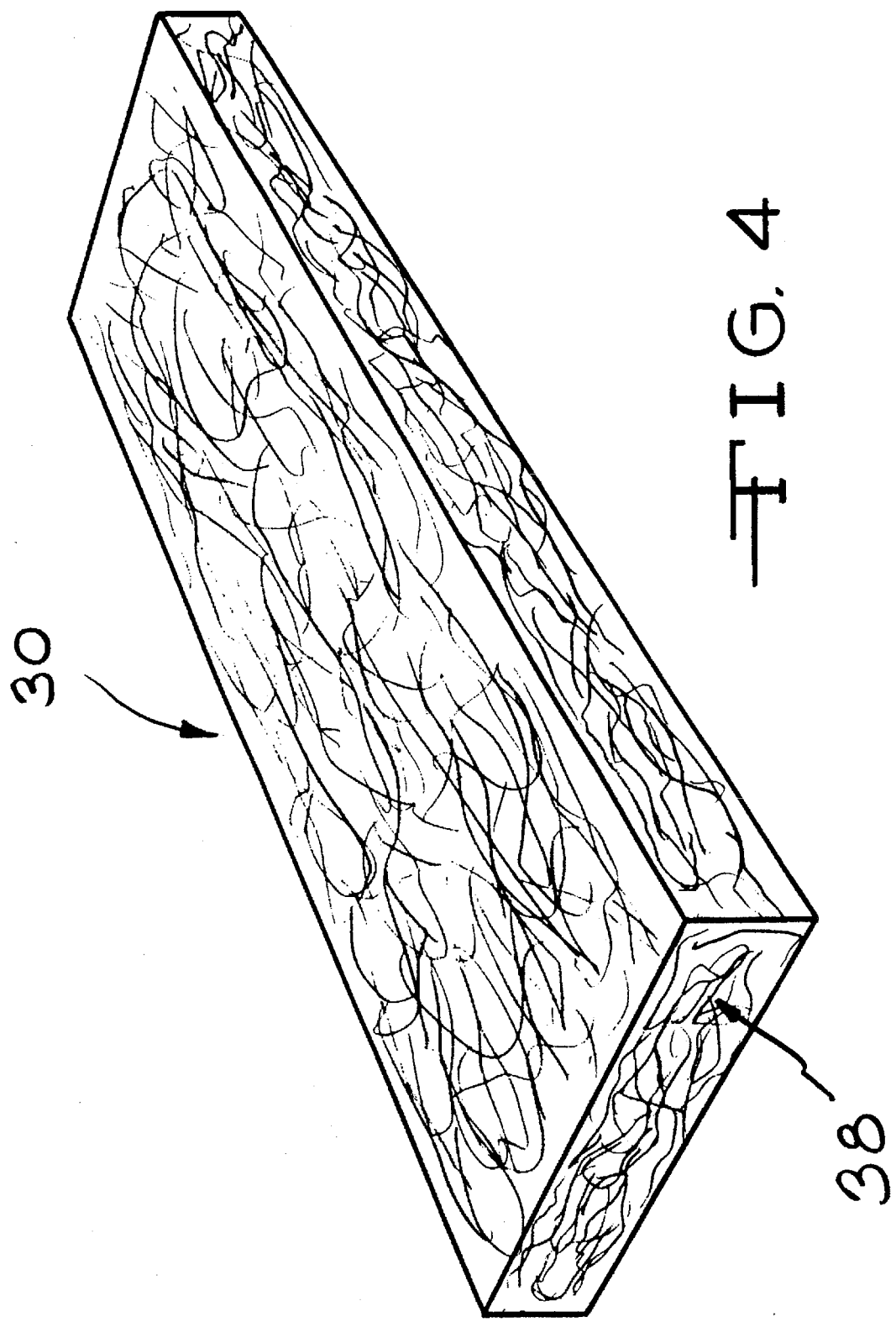
FIG. 4 is a view of insulation showing entangled, irregularly-shaped fibers of the invention.

FIG. 4 shows insulation product 30 comprised of entangled, irregularly-shaped glass fibers 38.

Figure 5:
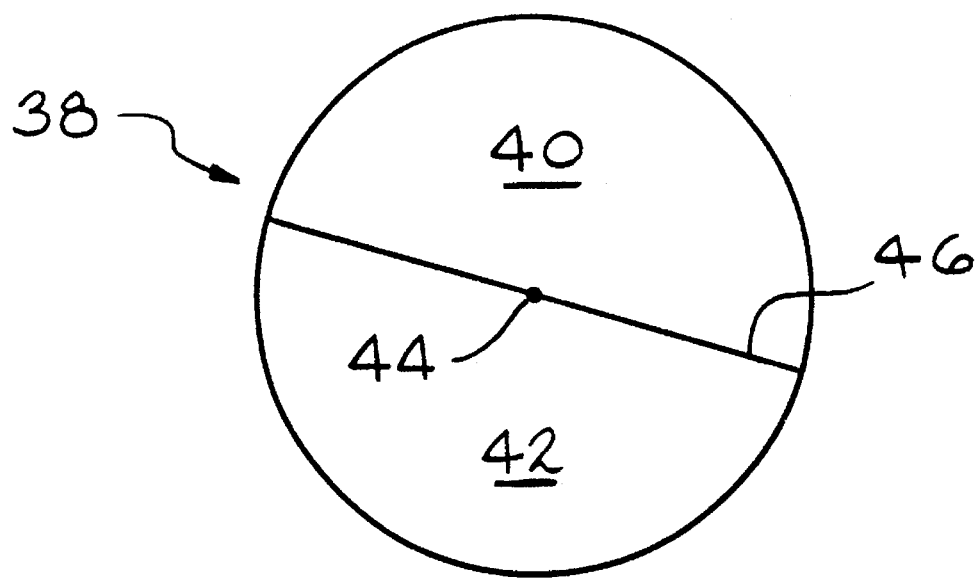
FIG. 5 is a cross-sectional view of an irregularly- shaped fiber of the invention having a 50:50 A/B glass ratio.

FIG. 5 is a cross-sectional view of an ideal irregularly-shaped glass fiber 38 having a 50:50 A/B glass ratio. Halves 40 and 42 essentially are equal in the ideal with point 44 being the center and line 46 being the diameter.

Figure 6:
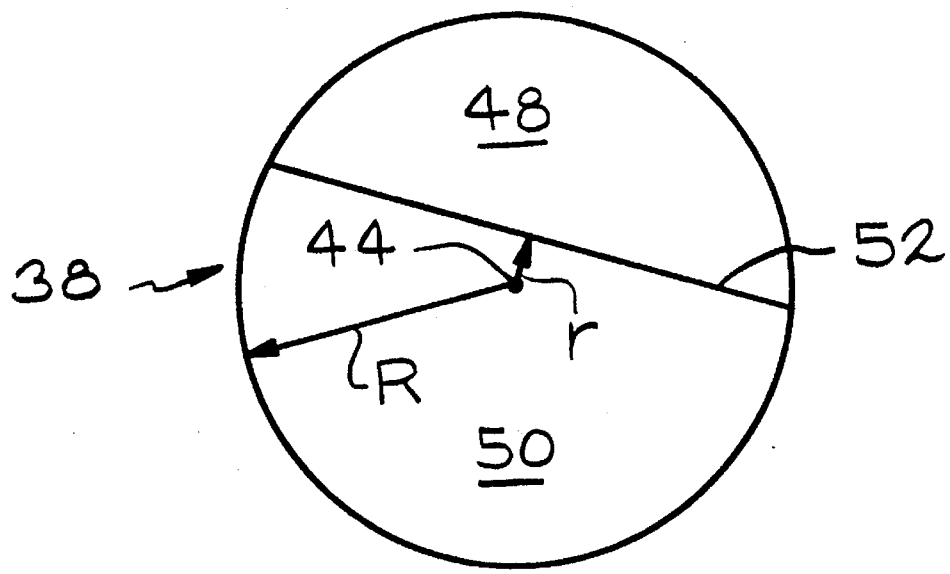
FIG. 6 is a view of an irregularly- shaped fiber having an A/B glass ratio of less than 50:50.

FIG. 6 shows a more typical cross-section where halves 48 and 50 are not equal. Line 52 is no longer a diameter, but just a divider. Lines R and r are shown to locate center point 44.

The deviation ratio is a measure of how far the A/B glass ratio is away from 50:50. The larger the deviation from 50:50, the larger r will be as a percent of R.

The irregularly-shaped fibers of the present invention are dual-glass fibers, i.e. each fiber is composed of two different glass compositions, glass A and glass B. If one were to make a cross-section of an ideal irregularly-shaped glass fiber of the present invention, one half of the fiber would be glass A, with the other half glass B. In reality, a wide range of proportions of the amounts of glass A and glass B may exist in the various irregularly-shaped glass fibers in the wool insulating material (or perhaps even over the length of an individual fiber). In general, insulation products of the irregularly-shaped fibers will consist of fibers of all different combinations of the percentages of glass A and glass B, including a small fraction of fibers that are single component.

Optical micrographs of the fibers easily show the two components due to differences in the refractive index. Also, in some cases, the two components can easily be seen due to the color difference if the iron content is significantly different in the two glasses.

Due to a continuously changing attenuation environment, each irregularly-shaped fiber is twisted in a unique way. No two fibers are exactly alike. The fiber's final shape is one with a baseline curvature due to the dual-glass nature, which is modified by the twisting, irregular rotation of the plane of curvature caused by the continuously changing attenuation environment. The fiber has a baseline curvature that is twisted through three dimensions. It is generally not helical. The fiber's irregular nature allows the irregularly-shaped glass fibers to stand apart from one another and achieve a uniform volume filling nature.

A number of mineral wool processes previously known can be used to produce fibers by the present invention. Several examples of suitable mineral wool processes include those found in U.S. Pat. Nos. 2,257,767, 2,206,058, 4,243,400, 3,885,940 and 3,874,886. The primary criteria is that the glasses be fed parallel into a single stream which is then further attenuated by a gas jet.

The following examples further demonstrate the glass fibers of the present invention.

Example 1

We produced irregularly-shaped glass fibers of the present invention having the following two compositions, viscosities and liquidus temperature:

| Ingredients | Weight Percent |
|---|---|
| $SiO_2$ | 41.46 |
| $Al_2O_3$ | 13.27 |
| $Na_2O$ | 0.61 |
| $K_2O$ | 0.13 |
| MgO | 8.37 |
| CaO | 33.18 |
| $TiO_2$ | 0.36 |
| $Fe_2O_3$ | 2.62 |
| Temperature for a Viscosity of 10 Poise, | 2,524° F. |
| Liquidus Temperature | 2,381° F. |
| $SiO_2$ | 42 |
| $Al_2O_3$ | 10.9 |
| $Na_2O$ | 17.44 |
| $K_2O$ | 0.82 |
| MgO | 7.07 |
| CaO | 21.20 |
| Temperature for a Viscosity of 10 poise | 2,480° F. |
| Liquidus Temperature | 2,427° F. |

Irregular-shaped glass fibers of the present invention were produced in a batch-mode laboratory fiberizer. The two glasses were melted in a Pt crucible with a Pt divider to keep the glasses separate. The glasses had a viscosity of less than 10 poise at 2,550° F. The two coefficients of thermal expansion were 12.2 and $7.5 \times 10^{-6}$/°C. respectively. After being well melted, a Pt plug at the bottom of this crucible was removed and fiber was blown with a "V nozzle" with air at about 90 psi. Two component fiber was produced. Optical micrographs showed the two component fiber and curl of the fiber.

The irregular glass fibers were collected and formed into standard insulation products in the shape of wool batts.

We claim:

1. Irregularly-shaped glass fibers suitable for insulation, each glass fiber comprising two distinct glasses, each glass having a different coefficient of thermal expansion, wherein the coefficients of thermal expansion differ by at least 2.0 ppm/°C., each glass having a different glass composition and each glass composition being boron-free, wherein the first boron-free glass composition consists essentially of:

| Ingredients | Weight Percent |
|---|---|
| $SiO_2$ | 35–65 |
| $Al_2O_3$ | 0–17 |
| MgO | 0–30 |
| CaO | 5–40 |
| FeO | 0–17 |
| $Na_2O + K_2O$ | 0–10 |
| $SiO_2 + Al_2O_3$ | ≧45 |
|  | ≦70 |
| Temperature for a Viscosity of 10 Poise | >2,350° F. <3,400° F. | having a liquidus temperature at least 50° F. below the 10 poise viscosity temperature; and the second boron-free glass composition consists essentially of:

| Ingredients | Weight Percent |
| --- | --- |
| SiO$_2$ | 35–65 |
| Al$_2$O$_3$ | 0–17 |
| MgO | 0–30 |
| CaO | 5–40 |
| FeO | 0–17 |
| Na$_2$O + K$_2$O | 0–25 |
| SiO$_2$ + Al$_2$O$_3$ | ≧45 |
|  | ≦70 |
| Temperature for a Viscosity of 10 Poise | >2,350° F. <3,400° F. | having a liquidus temperature of at least 50° F. below the 10 poise viscosity temperature.

2. Glass fibers according to claim 1 wherein the first boron-free glass composition consists essentially of:

| Ingredients | Weight Percent |
| --- | --- |
| SiO$_2$ | 40–64 |
| Al$_2$O$_3$ | 0–16 |
| MgO | 1–27 |
| CaO | 10–37 |
| FeO | 0–16 |
| Na$_2$O + K$_2$O | 0–5 |
| SiO$_2$ + Al$_2$O$_3$ | ≧47 |
|  | ≦67 |
| Temperature for a Viscosity of 10 Poise | >2,400° F. <3,200° F. | having a liquidus temperature at least 100° F. below the 10 poise viscosity temperature; and the second boron-free glass composition consists essentially of:

| Ingredients | Weight Percent |
| --- | --- |
| SiO$_2$ | 40–64 |
| Al$_2$O$_3$ | 0–16 |
| MgO | 1–27 |
| CaO | 10–37 |
| FeO | 0–16 |
| Na$_2$O + K$_2$O | 7–22 |
| SiO$_2$ + Al$_2$O$_3$ | ≧47 |
|  | ≦67 |
| Temperature for a Viscosity of 10 Poise; | >2,400° F. <3,200° F. | having a liquidus temperature at least 100° F. below the 10 poise viscosity temperature.

3. Glass fibers according to claim 1 wherein the first boron-free glass composition consists essentially of:

| Ingredients | Weight Percent |
| --- | --- |
| SiO$_2$ | 45–63 |
| Al$_2$O$_3$ | 0–15 |
| MgO | 2–25 |
| CaO | 15–35 |
| FeO | 0–15 |
| Na$_2$O + K$_2$O | 0–2.5 |
| SiO$_2$ + Al$_2$O$_3$ | ≧50 |
|  | ≦65 |
| Temperature for a Viscosity of 10 Poise | >2,450° F. <3,000° F. | having a liquidus temperature at least 100° F. below the 10 poise viscosity temperature; and the second boron-free composition consists essentially of:

| Ingredients | Weight Percent |
| --- | --- |
| SiO$_2$ | 45–63 |
| Al$_2$O$_3$ | 0–15 |
| MgO | 2–25 |
| CaO | 15–35 |
| FeO | 0–15 |
| Na$_2$O + K$_2$O | 10–20 |
| SiO$_2$ + Al$_2$O$_3$ | ≧50 |
|  | ≦65 |
| Temperature for a Viscosity of 10 Poise | >2,450° F. <3,000° F. | having a liquidus temperature at least 100° F. below the 10 poise viscosity temperature.

4. Glass fibers according to claim 1 wherein the first boron-free glass composition consists essentially of:

| Ingredients | Weight Percent |
| --- | --- |
| SiO$_2$ | 40–64 |
| Al$_2$O$_3$ | 0–5 |
| MgO | 0–30 |
| CaO | 5–40 |
| FeO | 0–17 |
| Na$_2$O + K$_2$O | 0–10 |
| SiO$_2$ + Al$_2$O$_3$ | ≧45 |
|  | ≦69 |
| Temperature for a Viscosity of 10 Poise | >2,350° F. <3,400° F. | having a liquidus temperature at least 50° F. below the 10 poise viscosity temperature; and the second boron-free glass composition consists essentially of:

| Ingredients | Weight Percent |
| --- | --- |
| SiO$_2$ | 40–64 |
| Al$_2$O$_3$ | 0–5 |
| MgO | 0–30 |
| CaO | 5–40 |
| FeO | 0–17 |
| Na$_2$O + K$_2$O | 0–25 |
| SiO$_2$ + Al$_2$O$_3$ | ≧45 |
|  | ≦69 |
| Temperance for a Viscosity of 10 Poise | >2,350° F. <3,400° F. | having a liquidus temperature at least 50° F. below the 10 poise viscosity temperature.

5. Glass fibers according to claim 1 wherein the first boron-free glass composition consists essentially of:

| Ingredients | Weight Percent |
| --- | --- |
| SiO$_2$ | 41.46 |
| Al$_2$O$_3$ | 13.27 |
| Na$_2$O | 0.61 |
| K$_2$O | 0.13 |
| MgO | 8.37 |
| CaO | 33.18 |
| TiO$_2$ | 0.36 |
| Fe$_2$O$_3$ | 2.62 |
| Temperature for a Viscosity of 10 Poise | 2,524° F. |
| Liquidus, Temperature | 2,381° F. | and the second boron-free glass composition consists essentially of:

| Ingredients | Weight Percent |
| --- | --- |
| $SiO_2$ | 42 |
| $Al_2O_3$ | 10.9 |
| $Na_2O$ | 17.44 |
| $K_2O$ | 0.82 |
| MgO | 7.07 |
| CaO | 21.20 |
| Temperature for a Viscosity of 10 Poise | 2,480° F. |
| Liquidus Temperature | 2,427° F. |

6. Glass fiber insulation comprising a collection of irregularly-shaped glass fibers according to claim 1.

7. Glass fiber insulation comprising a collection of irregularly-shaped glass fibers according to claim 2.

8. Glass fiber insulation comprising a collection of irregularly-shaped glass fibers according to claim 3.

9. Glass fiber insulation comprising a collection of irregularly-shaped glass fibers according to claim 4.

10. Glass fiber insulation comprising a collection of irregularly-shaped glass fibers according to claim 5.

\* \* \* \* \*